(12) United States Patent
Beers et al.

(10) Patent No.: US 12,504,016 B2
(45) Date of Patent: Dec. 23, 2025

(54) BEARING COOLING FLOW PATH FOR A CABIN AIR COMPRESSOR

(71) Applicant: Hamilton Sundstrand Corporation, Charlotte, NC (US)

(72) Inventors: Craig M. Beers, Wethersfield, CT (US); Brent J. Merritt, Southwick, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 31 days.

(21) Appl. No.: 18/430,146

(22) Filed: Feb. 1, 2024

(65) Prior Publication Data
US 2025/0250983 A1    Aug. 7, 2025

(51) Int. Cl.
| F04D 25/06 | (2006.01) |
| B64D 13/06 | (2006.01) |
| F04D 17/10 | (2006.01) |
| F04D 29/05 | (2006.01) |
| F04D 29/051 | (2006.01) |
| F04D 29/58 | (2006.01) |

(52) U.S. Cl.
CPC ............ *F04D 25/06* (2013.01); *B64D 13/06* (2013.01); *F04D 17/10* (2013.01); *F04D 29/0513* (2013.01); *F04D 29/582* (2013.01); *B64D 2013/0644* (2013.01)

(58) Field of Classification Search
CPC ...... F04D 25/06; F04D 17/10; F04D 29/0513; F04D 29/582; B64D 13/06; B64D 2013/0644
See application file for complete search history.

(56) References Cited

U.S. PATENT DOCUMENTS

| 7,029,246 | B2 * | 4/2006 | Miller ................. F04C 15/0069 |
| | | | 417/420 |
| 7,302,804 | B2 | 12/2007 | Murry et al. |
| 9,057,283 | B2 | 6/2015 | Gee et al. |
| 10,160,546 | B2 | 12/2018 | Beers et al. |
| 10,385,860 | B2 * | 8/2019 | Drechsel ................ F04D 17/10 |

(Continued)

FOREIGN PATENT DOCUMENTS

| EP | 3771830 A1 | 2/2021 |
| EP | 4019784 A1 | 6/2022 |

OTHER PUBLICATIONS

Extended European Search Report for EP Application No. 25151415.4, dated Jun. 3, 2025, 8 pages.

*Primary Examiner* — Dapinder Singh
(74) *Attorney, Agent, or Firm* — Kinney & Lange, P.A.

(57) ABSTRACT

A compressor includes a compressor rotor and a motor disposed about a common axis. The motor includes a rotor shaft coupled to the compressor rotor and configured to drive the compressor rotor; a thrust shaft disposed at an opposite end of the motor from the rotor shaft; a tie rod disposed on the common axis and extending through the rotor shaft, thrust shaft, and the compressor rotor, the tie rod axially retaining the compressor rotor at a forward end and the motor at an aft end; a cooling fluid inlet disposed at an aft end of the motor; and a motor rotor cooling flow path extending from the thrust shaft to the rotor shaft. The rotor shaft includes a plurality of orifices that open to a cavity on a backside of the compressor rotor and fluidly couple the motor rotor cooling flow path to the cavity.

20 Claims, 2 Drawing Sheets

(56) References Cited

U.S. PATENT DOCUMENTS

| | | |
|---|---|---|
| 11,143,203 B2 | 10/2021 | Merritt et al. |
| 11,225,978 B2 | 1/2022 | Merritt et al. |
| 11,261,880 B2 | 3/2022 | Merritt et al. |
| 11,365,742 B2 | 6/2022 | Pal et al. |
| 11,530,705 B2 | 12/2022 | Beers |
| 11,668,324 B2 | 6/2023 | Merritt et al. |
| 2015/0204350 A1* | 7/2015 | Sishtla .................. H02K 9/193 416/95 |
| 2021/0033110 A1* | 2/2021 | Merritt .................. F04D 17/10 |
| 2022/0194601 A1 | 6/2022 | Merritt et al. |

* cited by examiner

BEARING COOLING FLOW PATH FOR A CABIN AIR COMPRESSOR

BACKGROUND

The present disclosure is directed generally to an air compressor and, more particularly, to structure and methods for cooling a motor and bearings of a compressor suitable for providing pressurized air to an aircraft environmental control system.

As an alternative to bleed air, a separate air compressor, such as a cabin air compressor, can be used to provide pressurized air to an aircraft environmental control system. Using a separate air compressor can reduce both the overall complexity and the need for maintenance of the environmental control system. Using a separate air compressor can also improve fuel efficiency of the environmental control system.

SUMMARY

In one aspect, a compressor includes a compressor rotor and a motor disposed about a common axis. The motor includes a rotor shaft coupled to the compressor rotor and configured to drive the compressor rotor; a thrust shaft disposed at an opposite end of the motor from the rotor shaft; a tie rod disposed on the common axis and extending through the rotor shaft, thrust shaft, and the compressor rotor, the tie rod axially retaining the compressor rotor at a forward end and the motor at an aft end; a cooling fluid inlet disposed at an aft end of the motor; and a motor rotor cooling flow path extending from the thrust shaft to the rotor shaft. The rotor shaft includes a plurality of orifices that open to a cavity on a backside of the compressor rotor and fluidly couple the motor rotor cooling flow path to the cavity.

Another aspect relates to a method for cooling a compressor having a compressor rotor driven by a motor, wherein the motor and compressor rotor are disposed on a common axis with the compressor rotor arranged forward of the motor. The method includes providing a motor rotor cooling stream across a motor rotor from a thrust shaft to a rotor shaft, the thrust shaft coupled to an aft end of a motor rotor and the rotor shaft coupled to a forward end of the motor rotor; providing the motor rotor cooling stream through orifices in the rotor shaft to a cavity on a back side of a compressor rotor; and exhausting the motor rotor cooling stream from the compressor. The motor rotor cooling stream bypasses a cavity housing a stator of the motor.

The present summary is provided only by way of example, and not limitation. Other aspects of the present disclosure will be appreciated in view of the entirety of the present disclosure, including the entire text, claims and accompanying figures.

Figure 1:
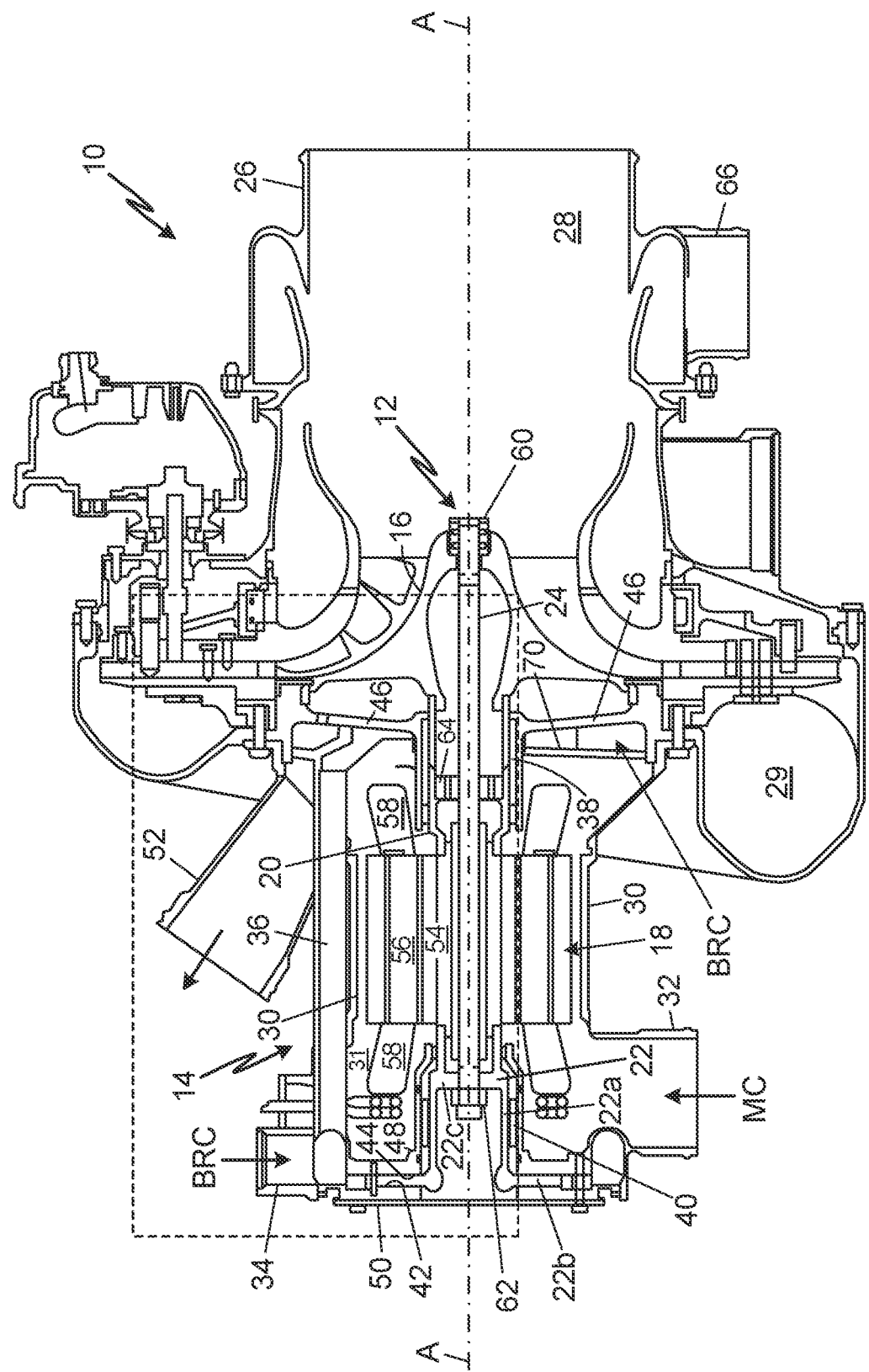
FIG. 1 is a simplified cross-sectional view of an example of a cabin air compressor.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present invention includes cooling structures and architectures for motor-driven compressors, such as a cabin air compressor used to provided pressurized air to an environmental control system (ECS) of an aircraft. The disclosed architecture provides, from a cooling air inlet, a first dedicated cooling stream to a compressor rotor bearing and a second bearing and rotor cooling stream to and sequentially through aft rotor bearings and a motor rotor. In this manner, each of the compressor rotor bearing and the aft rotor bearings receives the coolest, highest pressure cooling air available. The second bearing and rotor cooling stream is discharged to a cavity behind the compressor rotor (separated from the motor cooling cavity and a compressor inlet) and subsequently exhausted via a motor cooling outlet. Discharging to the cavity behind the compressor rotor provides an efficiency gain over architectures that discharge cooling streams to a compressor inlet. Additionally, discharge to the cavity behind the compressor rotor can provide improved efficiency by maintaining a pressure drop at a motor gap.

FIG. 1 is a simplified cross-sectional view of air compressor 10. Compressor 10 can be used to provide pressurized air to an aircraft ECS. Compressor 10 is configured to intake ambient air exterior to the aircraft and increase the ambient pressure, generating compressed air, which can be delivered to a passenger cabin of the aircraft. Compressor 10 includes shaft assembly 12 and static assembly 14. Shaft assembly 12 includes, among other components not specifically identified herein, compressor rotor 16, motor 18, rotor shaft 20, thrust shaft 22, and tie rod 24. Static assembly 14 includes, among other components not specifically identified herein, compressor housing 26, compressor inlet 28, air outlet 29, motor housing 30, motor cooling inlet 32, bearing and rotor cooling inlet 34, transfer tube 36, journal bearings 38, 40, thrust bearings 42, 44, bearing supports 46, 48, end plate 50, and cooling air outlet 52. Shaft assembly 12 is centered on axis A-A with tie rod 24 extending on axis A-A and compressor rotor 16 and motor 18 attached thereto at opposite axial ends. For purposes of identifying the relative location of components described herein, end plate 50 is positioned at an axially aftmost end of compressor 10 and compressor inlet 28 is positioned at an axially forwardmost end of compressor 10.

Compressor inlet 28 can be fluidly connected to a source of ambient air (e.g., ram air intake). Air outlet 29 can be fluidly connected to an ECS of an aircraft. In operation, motor 18 drives the rotation of compressor rotor 16 via rotor shaft 20. Compressor rotor 16 is an impeller or radial compressor. Compressor rotor 16 directs air through compressor housing 26 when compressor rotor 16 is rotated by motor 18. Specifically, a flow of air enters compressor housing 26 through inlet 28 and is pumped radially outward by compressor rotor 16, pressurizing the flow of air. The pressurized flow of air exits compressor 10 through air outlet 29 for delivery to, for example, an ECS of the aircraft.

Motor 18 is an electric motor as known in the art. Motor 18 includes motor rotor 54 and motor stator 56. Motor stator 56 is disposed concentrically about motor rotor 54 and includes windings 58. Motor 18 is housed in motor housing 30, which defines cavity 31 around stator windings 58, to which a cooling air can be provided. Motor rotor 54, which can be an assembly of permanent magnets or electromagnets as known in the art, rotates about axis A-A. A forward end of motor rotor 54 is coupled to rotor shaft 20. An aft end of motor rotor 54 is coupled to thrust shaft 22. Rotor shaft 20 is coupled to compressor rotor 16 to drive rotation of compressor rotor 16. Thrust shaft 22 includes axially extending portion 22a, radially extending thrust runner or disk 22b, and radially extending retention portion 22c.

Tie rod 24 is configured to axially preload and provide an axial clamping force to components of shaft assembly 12, including compressor rotor 16 and motor 18, including rotor shaft 20 and thrust shaft 22. Tie rod 24 is centered on axis A-A and extends through each of compressor rotor 16, motor 18, rotor shaft 20 and thrust shaft 22. The ends of tie rod 24 are attached to retention nuts 60 and 62, configured to axially restrain the components of shaft assembly 12. Retention nut 60 is disposed at a forward end of tie rod 24 adjacent to compressor rotor 16. Retention nut 62 is disposed at an aft end of tie rod 24 adjacent to thrust shaft 22 (radially extending retention portion 22c). Tie rod support (TRS) 64 can be provided within rotor shaft 20 to support tie rod 24, limit tie rod vibration, and prevent tie rod 24 from achieving a detrimental bending mode. TRS 64 is a generally annular support disposed about tie rod 24 and configured to interface with each of tie rod 24 and an inner diameter surface of rotor shaft 20.

Shaft assembly 12 is radially supported within housings 26 and 30 by journal bearings 38 and 40 and bearing supports 46 and 48. Shaft assembly 12 is axially restrained within housings 26 and 30 by thrust bearings 42 and 44, bearing support 48, and end plate 50. Journal bearings 38 and 40 are concentrically disposed about axis A-A. Journal bearing 38 is disposed radially between rotor shaft 20 and an axially extending portion of bearing support 46 coupled to compressor housing 26. Journal bearing 40 is disposed radially between axially extending portion 22a of thrust shaft 22 and an axially extending portion of bearing support 48 coupled to motor housing 30. Thrust bearings 42 and 44 are disposed on opposite sides of thrust runner 22b of thrust shaft 22. Thrust bearings 42 are disposed axially between end plate 50 and thrust runner 22b of thrust shaft 22 to axially restrain shaft assembly 12.

Motor 18, journal bearings 38, 40, and thrust bearings 42, 44 are cooled with cooling air. A motor cooling stream MC can be drawn from compressor inlet 28 at outlet 66 and provided to motor cooling inlet 32. The motor cooling stream MC can be delivered to motor cavity 31 defined by motor housing 30. The motor cooling stream MC can exit compressor 10 via cooling air outlet 52. Cooling air outlet 52 can be configured to couple to an exhaust duct for discharge from the aircraft.

A bearing and rotor cooling stream BRC can be drawn from downstream of air outlet 29 and provided to bearing and rotor cooling inlet 34. In some examples, a heat exchanger (not shown) can be disposed upstream of cooling inlet 34 and downstream of air outlet 29 to cool air in the bearing and rotor cooling stream BRC. The bearing and rotor cooling stream BRC cools thrust bearings 42, 44, journal bearings 38, 40, and motor rotor 54.

Figure 2:
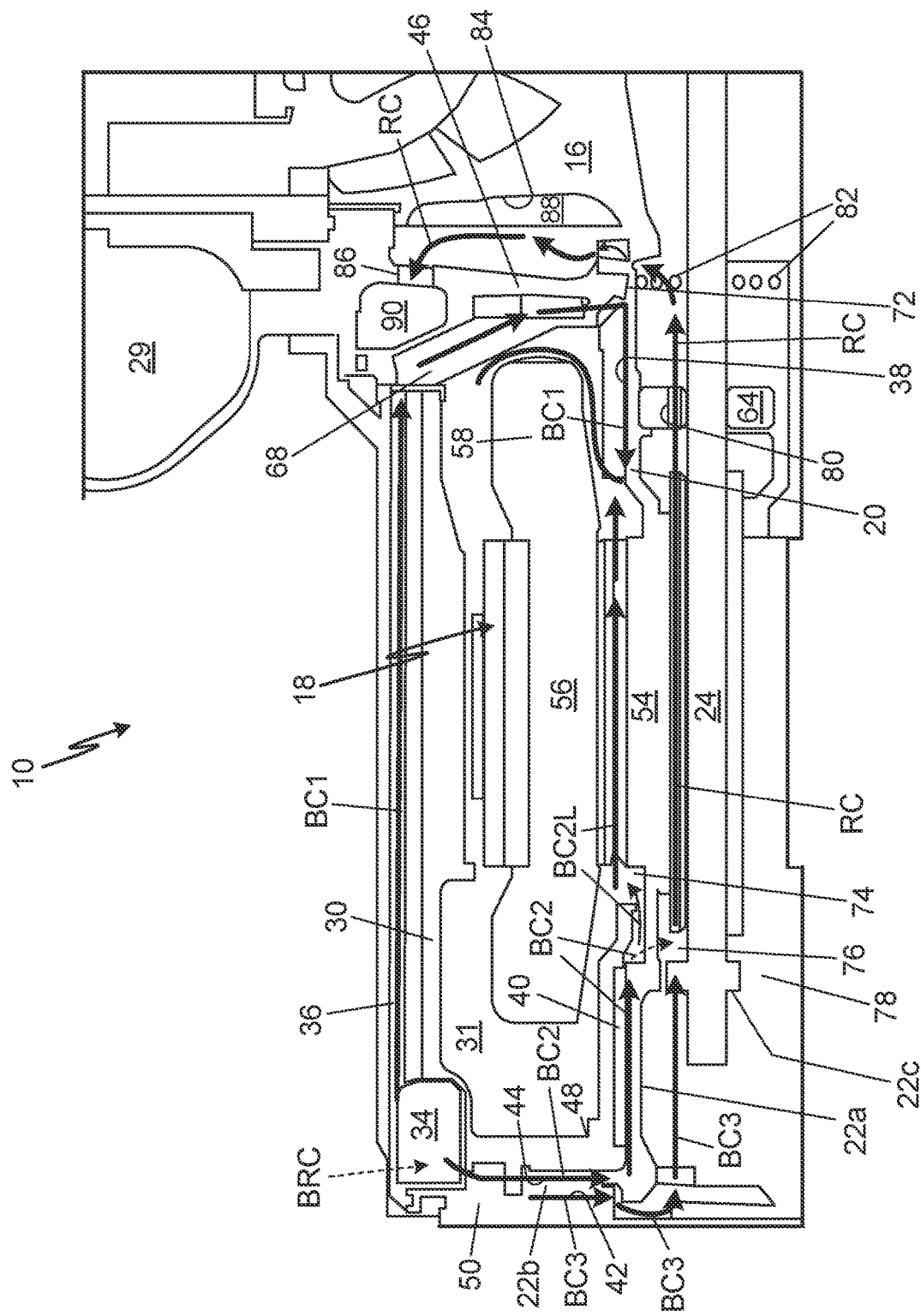
FIG. 2 is a detailed view of portion 2 of FIG. 1, illustrating cooling fluid flow through the cabin air compressor.

FIG. 2 shows detailed portion 2 of FIG. 1, illustrating cooling fluid flow through compressor 10. FIG. 2 shows compressor rotor 16, motor 18, rotor shaft 20, thrust shaft 22 (axially extending portion 22a, thrust runner 22b, and retention portion 22c), tie rod 24, motor housing 30, bearing and rotor cooling inlet 34, transfer tube 36, journal bearings 38 and 40, thrust bearings 42 and 44, bearings supports 46 and 48, end plate 50, motor rotor 54, motor stator 56 with windings 58, TRS 64, duct 68, heat shield 70, seals 72, 73, and 74, thrust shaft orifices 76 and 78, TRC orifices 80, rotor shaft orifices 82, backside 84 of compressor rotor 16, opening 86, and cavities 88 and 90.

As illustrated in FIG. 2, bearing and rotor cooling stream BRC is split into three bearing cooling streams BC1, BC2, and BC3 at bearing and rotor cooling inlet 34, which is disposed at an aft end of motor 18. BC1 provides a dedicated cooling stream to journal bearing 38. BC2 provides cooling to thrust bearing 42 and journal bearing 40. BC3 provides cooling to thrust bearing 40. Bearing cooling stream BC3 is directed from thrust bearing 40 to an inner diameter of thrust shaft 22 to provide rotor cooling stream RC to cool motor rotor 54. Bearing cooling streams BC3 and BC2 combine at a location axially forward of journal bearing 40 (downstream of BC2 flow through journal bearing 40) to provide rotor cooling stream RC.

A flow path of rotor cooling stream RC extends from thrust shaft 22 to rotor shaft 20. A flow path of bearing cooling stream BC1 extends through transfer tube 36, duct 68, journal bearing 38, and motor cavity 31. A flow path of bearing cooling stream BC2 extends through thrust bearing 44 and journal bearing 40 and into an inner diameter of thrust rotor 22 wherein bearing cooling stream BC2 joins bearing cooling stream BC3 to provide rotor cooling stream RC. A flow path of bearing cooling stream BC3 extends through thrust bearing 42 into an inner diameter of thrust rotor 22 and through retention portion 22c of thrust rotor 22 to join bearing cooling stream BC2.

Bearing cooling stream BC1 is a dedicated cooling stream provided to journal bearing 38. The load on journal bearing 38 is significantly greater than the load on journal bearing 40. Dedicated cooling flow provided by bearing cooling stream BC1 helps ensure that journal bearing 38 can operate with increased reliability. Transfer tube 36 communicates bearing cooling stream BC1 from bearing rotor cooling inlet 34 across motor housing 30. Transfer tube 36 is disposed radially outward of motor 18. Although not clearly illustrated, transfer tube 36 can be disposed radially outward of and radially displaced from motor housing 30. Opposite ends of transfer tube 36 can be secured to motor housing 30. Transfer tube 36 can open to duct 68 provided through heat shield 70. Heat shield 70 is an annular wall that defines a portion of motor cavity 31 provided around motor stator 56. Bearing support 46 is an annular structure including an axially extending portion supporting journal bearing 38 and radially extending portion coupled to compressor housing 26. Heat shield 70, together with bearing support 46, can define an annular cavity configured to direct bearing cooling stream BC1 to an axially forward location of journal bearing 38. Duct 68 can be angled with respect to axis A-A to redirect bearing cooling stream BC1 received from transfer tube 36 radially inward to journal bearing 38. The arrangement and configuration of components for transferring bearing cooling stream BC1 (i.e., duct 68, heat shield 70, and bearing support 46) to journal bearing 38 are not limited to those shown.

Bearing cooling stream BC1 is provided to a forward end of journal bearing 38 and flows axially in a forward to aft direction through journal bearing 38. Bearing cooling stream BC1 flows in the same direction as airflow through compressor inlet 28. Seal 72 is disposed axially forward of journal bearing 38 (i.e., downstream of bearing cooling stream BC1 through journal bearing 38) between rotor shaft 20 and bearing support 46. Seal 72 is configured to maintain flow of bearing cooling stream BC1 through journal bearing 38 and to limit leakage of bearing cooling stream BC1 into cavity 88 defined between bearing support 46 and compressor rotor 16. Seal 73 is disposed aft of journal bearing 38 (i.e., downstream of bearing cooling stream BC1 through journal bearing 38). Seals 72 and 73 maintain pressure in journal bearing 38 to minimize a pressure drop across journal bearing 38, which improves the lifetime and reliability of journal bearing 38. Seal 73 provides increased clearance for passage of bearing cooling stream BC1 through journal bearing 38 and into motor cavity 31. Seals 72 and 73 can be, for example, labyrinth seals.

Bearing cooling stream BC1 exits the aft end of journal bearing 38 to motor cavity 31. Bearing cooling stream BC1 can flow around end turns (windings) 58 of motor stator 56 to provide additional motor cooling. Because bearing cooling stream BC1 bypasses thrust bearings 42 and 44, journal bearing 40, and motor rotor 54, bearing cooling stream BC1 is cooler when it enters journal bearing 38 and can retain some cooling capacity when it enters motor cavity 31. The additional cooling capacity in motor cavity 31 is beneficial to cooling end turn or windings 58 of stator 56. Ultimately, bearing cooling stream BC1 can exit compressor 10 via cooling air outlet 52 (shown in FIG. 1).

Bearing cooling streams BC2 and BC3 pass through thrust bearings 44 and 42, respectively, disposed on opposite sides of thrust runner 22b. Bearing cooling streams BC2 and BC3 pass through thrust bearings 42 and 44 in a radially inward direction. Bearing cooling stream BC2 is subsequently directed in an axial direction through journal bearing 40. Bearing cooling stream BC2 flows through journal bearing 40 axially in an aft to forward direction opposite the direction of flow of bearing cooling stream BC1 through journal bearing 38.

Axially extending portion 22a of thrust shaft 22 comprises a plurality of orifices 78 at an axial location forward of journal bearing 40 (downstream of flow of bearing cooling stream BC2 through journal bearing 40). Orifices 76 are circumferentially arranged about thrust shaft 22 and can extend through thrust shaft 22 generally perpendicular to axis A-A. Bearing cooling stream BC1 exits journal bearing 40 and is directed through orifices 76 to an inside diameter of thrust shaft 22 (forward of retention portion 22c) and to an inner diameter of motor rotor 54.

Seal 74 is disposed at a location axially forward of orifices 76 (i.e., downstream of bearing cooling stream BC2 through journal bearing 40) between thrust shaft 22 and bearing support 48. Seal 74 is configured to maintain flow of bearing cooling stream BC2 through orifices 76 and to limit leakage of bearing cooling stream BC2 to a motor gap and motor cavity 31. Seal 74 maintains pressure in journal bearing 40 to minimize a pressure drop across journal bearing 40, which improves the lifetime and reliability of journal bearing 40. Seal 74 can be, for example, a labyrinth seal. Some amount of leakage across seal 74 can occur as shown by bearing cooling stream BC2L. The large majority of bearing cooling stream BC2 is directed through orifices 76 to the inner diameter of motor rotor 54 for rotor cooling.

Bearing cooling stream BC3 exits thrust bearing 42 to the inside diameter of thrust shaft 22 aft of retention portion 22c. A plurality of orifices 78 are provided in retention portion 22c to provide bearing cooling stream BC3 the forward side of retention portion 22c to combine with bearing cooling stream BC2. Orifices 78 are circumferentially arranged about retention portion 22c and can extend through retention portion 22c generally parallel to axis A-A. Bearing cooling streams BC2 and BC3 combine to provide rotor cooling stream RC to the inner diameter of motor rotor 54.

Rotor cooling stream RC passes along the inner diameter of motor rotor 54 adjacent tie rod 24. Rotor cooling stream RC provides cooling to a forward portion of thrust shaft 22, motor rotor 54, and rotor shaft 20. Rotor cooling stream RC flows axially forward from thrust shaft 22 to rotor shaft 20 (i.e., continuing in the fluid flow direction of bearing cooling streams BC2 and BC3 and opposite the fluid flow direction of bearing cooling flow BC1). Rotor cooling stream RC passes through orifices 80 in TRS 64, which is disposed in rotor shaft 20. Orifices 80 can be circumferentially arranged about TRS 64 and can extend through TRS 64 substantially parallel to axis A-A. Rotor cooling stream RC passes through orifices 80 to a forward end of rotor shaft 20. At this point, rotor cooling stream RC comprises a hot, high pressure air.

Rotor shaft 20 includes orifices 82 disposed at a forward end, axially forward of journal bearing 38. Orifices 82 can be circumferentially arranged about rotor shaft 20 and can extend through rotor shaft 20 generally perpendicular to axis A-A. Orifices 82 open to cavity 88 defined between bearing support 46 and backside 84 of compressor rotor 16. Bearing support 46 can include opening 86 through which the hot, high pressure air can flow towards motor cooling air outlet 52 to be exhausted from compressor 10.

As shown in FIG. 2, portions of bearing support 46 and heat shield 70 can form cavity 90, which is open to cavity 88 via opening 86. Cavity 90 is closed to duct 68 and bearing cooling stream BC1. Heat shield 70 thermally insulates duct 68 from the hot air in cavity 90. Cavity 90 is in fluid communication with motor cooling air outlet 52. From cavity 90, the hot, high pressure air can be exhausted from compressor 10 via motor cooling air outlet 52.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A compressor includes a compressor rotor and a motor disposed about a common axis. The motor includes a rotor shaft coupled to the compressor rotor and configured to drive the compressor rotor; a thrust shaft disposed at an opposite end of the motor from the rotor shaft; a tie rod disposed on the common axis and extending through the rotor shaft, thrust shaft, and the compressor rotor, the tie rod axially retaining the compressor rotor at a forward end and the motor at an aft end; a cooling fluid inlet disposed at an aft end of the motor; and a motor rotor cooling flow path extending from the thrust shaft to the rotor shaft. The rotor shaft includes a plurality of orifices that open to a cavity on a backside of the compressor rotor and fluidly couple the motor rotor cooling flow path to the cavity.

The compressor of the preceding paragraph can optionally include, additionally and/or alternatively, any one or more of the following features, configurations and/or additional components:

An embodiment of the foregoing compressor can further include first and second journal bearings disposed concentrically about the common axis to radially support the rotor shaft and thrust shaft, respectively, wherein the first journal bearing is disposed about the rotor shaft and the second journal bearing is disposed about the thrust shaft; and a transfer tube fluidly coupled to the cooling fluid inlet and the first journal bearing and defining a portion of a first bearing cooling flow path, the transfer tube configured to provide a dedicated cooling fluid flow from the cooling fluid inlet to the first journal bearing.

An embodiment of the compressor of any of the preceding paragraphs can further include first and second thrust bearings disposed adjacent to the thrust shaft to axially support a radially extending thrust runner of the thrust shaft, the first and second thrust bearings disposed on opposite sides of the thrust runner; a second bearing cooling flow path extending through the first thrust bearing and the second journal bearing; and a third bearing cooling flow path extending through the second thrust bearing; wherein each of the second and third bearing cooling flow paths combine to join the motor rotor cooling flow path.

In an embodiment of the compressor of any of the preceding paragraphs, the thrust shaft can include a plurality of orifices fluidly coupling the second bearing cooling flow path and the motor rotor cooling flow path.

In an embodiment of the compressor of any of the preceding paragraphs, the thrust shaft can further include a plurality of orifices fluidly coupling the third bearing cooling flow path and the motor rotor cooling flow path.

An embodiment of the compressor of any of the preceding paragraphs can further include a first seal disposed forward of the second journal bearing, the first seal configured to interface with the thrust shaft to preferentially direct a cooling fluid flow from the second journal bearing to an inner diameter of thrust shaft.

In an embodiment of the compressor of any of the preceding paragraphs, the transfer tube can be connected to the cooling fluid inlet at a first end and to a duct at a second end, the duct fluidly coupled to a forward end of the first journal bearing.

An embodiment of the compressor of any of the preceding paragraphs can further include an annular heat shield and an annular bearing support, the annular heat shield and annular bearing support extending radially and defining cavity therebetween open to the duct and the first journal bearing.

In an embodiment of the compressor of any of the preceding paragraphs, the first bearing cooling flow path can extend through the duct, through the first journal bearing, and into a cavity defined by a motor housing and the annular heat shield.

An embodiment of the compressor of any of the preceding paragraphs can further include an annular tie rod support disposed between the tie rod and the rotor shaft, the tie rod support comprising a plurality of orifices defining a portion of the motor rotor cooling flow path.

In an embodiment of the compressor of any of the preceding paragraphs, the cavity on the backside of the compressor rotor can be defined at least in part by the compressor rotor, a radially extending annular bearing support, and the rotor shaft.

In an embodiment of the compressor of any of the preceding paragraphs, the annular bearing support can include an orifice fluidly connected to a discharge duct, the discharge duct configured to exhaust a motor rotor cooling fluid from the compressor.

Another aspect relates to a method for cooling a compressor having a compressor rotor driven by a motor, wherein the motor and compressor rotor are disposed on a common axis with the compressor rotor arranged forward of the motor. The method includes providing a motor rotor cooling stream across a motor rotor from a thrust shaft to a rotor shaft, the thrust shaft coupled to an aft end of a motor rotor and the rotor shaft coupled to a forward end of the motor rotor; providing the motor rotor cooling stream through orifices in the rotor shaft to a cavity on a back side of a compressor rotor; and exhausting the motor rotor cooling stream from the compressor. The motor rotor cooling stream bypasses a cavity housing a stator of the motor.

The method of the preceding paragraph can optionally include, additionally and/or alternatively, any one or more of the following features, configurations, additional components, and/or steps:

An embodiment of the foregoing method can further include, providing a first bearing cooling stream to a first journal bearing disposed adjacent to the rotor shaft, the first bearing cooling stream provided to the first journal bearing through a transfer tube fluidly coupling a cooling fluid inlet and the first journal bearing.

An embodiment of the method of any of the preceding paragraphs can further include providing a second bearing cooling stream to a first thrust bearing disposed adjacent to a forward side of a thrust runner, the thrust runner extending radially from the thrust shaft, and to a second journal bearing disposed adjacent to the thrust shaft; and providing a third bearing cooling stream to a second thrust bearing disposed adjacent to an aft side of the thrust runner.

An embodiment of the method of any of the preceding paragraphs can further include combining the second and third bearing cooling streams with the motor rotor cooling stream.

An embodiment of the method of any of the preceding paragraphs can further include dividing an inlet cooling stream between the first bearing cooling stream, the second bearing cooling stream, and the third bearing cooling stream.

An embodiment of the method of any of the preceding paragraphs can further include providing a seal between a shaft supporting the second journal bearing and the thrust shaft at a location forward of the second journal bearing.

In embodiment of the method of any of the preceding paragraphs combining the second bearing cooling stream with the motor rotor cooling stream can include providing the second bearing cooling stream from the second journal bearing through radially extending orifices in the thrust shaft and providing the third bearing cooling stream from the second thrust bearing through axially extending orifices in the thrust shaft.

In embodiment of the method of any of the preceding paragraphs the motor rotor cooling stream can be provided along an inner diameter of each of the thrust shaft and the rotor shaft and is provided through orifices in an annular support disposed within the rotor shaft.

The invention claimed is:

1. A compressor comprising:
a compressor rotor configured to compress air;
a motor for driving the compressor rotor, the motor and compressor rotor disposed about a common axis, the motor comprising:
a rotor shaft coupled to the compressor rotor and configured to drive the compressor rotor, the rotor shaft comprising a plurality of orifices; and
a thrust shaft disposed at an opposite end of the motor from the rotor shaft;
a tie rod disposed on the common axis and extending through the rotor shaft, thrust shaft, and the compressor rotor, the tie rod axially retaining the compressor rotor at a forward end and the motor at an aft end;
a cooling fluid inlet disposed at an aft end of the motor; and
a motor rotor cooling flow path extending from the thrust shaft to the rotor shaft;
wherein the plurality of orifices in the rotor shaft open to a cavity immediately adjacent to a backside surface of the compressor rotor and fluidly couple the motor rotor cooling flow path to the cavity.

2. The compressor of claim 1, and further comprising:
first and second journal bearings disposed concentrically about the common axis to radially support the rotor shaft and thrust shaft, respectively, wherein the first journal bearing is disposed about the rotor shaft and the second journal bearing is disposed about the thrust shaft; and
a transfer tube fluidly coupled to the cooling fluid inlet and the first journal bearing and defining a portion of a first bearing cooling flow path, the transfer tube disposed radially outward of the motor and configured to provide a dedicated cooling fluid flow from the cooling fluid inlet to the first journal bearing.

3. The compressor of claim 2, and further comprising:
first and second thrust bearings disposed adjacent to the thrust shaft to axially support a radially extending thrust runner of the thrust shaft, the first and second thrust bearings disposed on opposite sides of the thrust runner;
a second bearing cooling flow path extending through the first thrust bearing and the second journal bearing; and
a third bearing cooling flow path extending through the second thrust bearing;
wherein each of the second and third bearing cooling flow paths combine to join the motor rotor cooling flow path.

4. The compressor of claim 3, wherein the thrust shaft comprises a plurality of orifices fluidly coupling the second bearing cooling flow path and the motor rotor cooling flow path.

5. The compressor of claim 4, wherein the thrust shaft further comprises a plurality of orifices fluidly coupling the third bearing cooling flow path and the motor rotor cooling flow path.

6. The compressor of claim 5, and further comprising a first seal disposed forward of the second journal bearing, the first seal configured to interface with the thrust shaft to preferentially direct a cooling fluid flow from the second journal bearing to an inner diameter of thrust shaft.

7. The compressor of claim 5, wherein the transfer tube is connected to the cooling fluid inlet at a first end and to a duct at a second end, the duct fluidly coupled to a forward end of the first journal bearing.

8. The compressor of claim 7, and further comprising:
an annular heat shield; and
an annular bearing support, the annular heat shield and annular bearing support extending radially and defining cavity therebetween open to the duct and the first journal bearing.

9. The compressor of claim 8, wherein the first bearing cooling flow path extends through the duct, through the first journal bearing, and into a cavity defined by a motor housing and the annular heat shield.

10. The compressor of claim 4, and further comprising an annular tie rod support disposed between the tie rod and the rotor shaft, the tie rod support comprising a plurality of orifices defining a portion of the motor rotor cooling flow path.

11. The compressor of claim 10, wherein the cavity on the backside of the compressor rotor is defined at least in part by the compressor rotor, a radially extending annular bearing support, and the rotor shaft.

12. The compressor of claim 11, wherein the annular bearing support comprises an orifice fluidly connected to a discharge duct, the discharge duct configured to exhaust a motor rotor cooling fluid from the compressor.

13. A method for cooling a compressor having a compressor rotor driven by a motor, wherein the motor and compressor rotor are disposed on a common axis with the compressor rotor arranged forward of the motor, the method comprising:
providing a motor rotor cooling stream across a motor rotor from a thrust shaft to a rotor shaft, the thrust shaft coupled to an aft end of a motor rotor and the rotor shaft coupled to a forward end of the motor rotor;
providing the motor rotor cooling stream through orifices in the rotor shaft to a cavity on a back side of a compressor rotor; and
exhausting the motor rotor cooling stream from the compressor;
wherein the motor rotor cooling stream bypasses a cavity housing a stator of the motor and bypasses a first journal bearing disposed radially between the rotor shaft and a compressor housing.

14. The method of claim 13, and further comprising providing a first bearing cooling stream to a first journal bearing disposed adjacent to the rotor shaft, the first bearing cooling stream provided to the first journal bearing through a transfer tube fluidly coupling a cooling fluid inlet and the first journal bearing, the transfer tube disposed radially outward of the motor.

15. The method of claim 14, and further comprising:
providing a second bearing cooling stream to a first thrust bearing disposed adjacent to a forward side of a thrust runner, the thrust runner extending radially from the thrust shaft, and to a second journal bearing disposed adjacent to the thrust shaft; and
providing a third bearing cooling stream to a second thrust bearing disposed adjacent to an aft side of the thrust runner.

16. The method of claim 15, and further comprising combining the second and third bearing cooling streams with the motor rotor cooling stream.

17. The method of claim 16, and further comprising dividing an inlet cooling stream between the first bearing cooling stream, the second bearing cooling stream, and the third bearing cooling stream.

18. The method of claim 16, and further comprising providing a seal between a shaft supporting the second journal bearing and the thrust shaft at a location forward of the second journal bearing.

19. The method of claim 16, wherein combining the second bearing cooling stream with the motor rotor cooling stream comprises:
   providing the second bearing cooling stream from the second journal bearing through radially extending orifices in the thrust shaft; and
   providing the third bearing cooling stream from the second thrust bearing through axially extending orifices in the thrust shaft.

20. The method of claim 15, wherein the motor rotor cooling stream is provided along an inner diameter of each of the thrust shaft and the rotor shaft and is provided through orifices in an annular support disposed within the rotor shaft.

* * * * *